United States Patent
Kolli et al.

(10) Patent No.: US 11,334,601 B2
(45) Date of Patent: May 17, 2022

(54) UNIFIED DATA MODEL

(71) Applicant: Oracle International Corporation, Redwood Shores, CA (US)

(72) Inventors: Ashish Kolli, Cupertino, CA (US); Ramakrishna Bollu, Mountain House, CA (US); Elangovan Subramanian, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 633 days.

(21) Appl. No.: 15/268,465

(22) Filed: Sep. 16, 2016

(65) Prior Publication Data

US 2017/0116303 A1    Apr. 27, 2017

Related U.S. Application Data

(60) Provisional application No. 62/245,581, filed on Oct. 23, 2015.

(51) Int. Cl.
| | |
|---|---|
| *G06F 16/28* | (2019.01) |
| *G06F 21/62* | (2013.01) |
| *G06F 16/27* | (2019.01) |
| *G06F 16/2455* | (2019.01) |
| *G06F 16/21* | (2019.01) |

(52) U.S. Cl.
CPC .......... *G06F 16/282* (2019.01); *G06F 16/213* (2019.01); *G06F 16/2455* (2019.01); *G06F 16/278* (2019.01); *G06F 16/28* (2019.01); *G06F 21/6227* (2013.01)

(58) Field of Classification Search
CPC ......... G06F 17/30292; G06F 17/30404; G06F 17/30595; G06F 17/30424; G06F 17/30557; G06F 17/30566; G06F 16/2455; G06F 21/6227; G06F 16/213; G06F 16/278; G06F 16/28; G06F 16/282; G06F 12/0802; G06F 16/211; G06F 16/254; G06F 16/285; G06F 16/288
USPC ......... 707/803, 999.102, E17.045, 805, 806, 707/807, E17.048, E17.12, 769, E17.014, 707/E17.032, E17.044, E17.107, 705, 707/736, 756, 793, 999.003, 718, 706
See application file for complete search history.

(56) References Cited

U.S. PATENT DOCUMENTS

| | | | | |
|---|---|---|---|---|
| 9,031,901 B1 * | 5/2015 | King | ............... | G06F 16/254 |
| | | | | 707/602 |
| 9,792,020 B1 * | 10/2017 | Kelley | ............... | G06F 17/30424 |
| 2003/0195889 A1 * | 10/2003 | Yao | ............... | G06F 16/30 |
| 2009/0259683 A1 * | 10/2009 | Murty | ............... | G06F 16/284 |

(Continued)

OTHER PUBLICATIONS

Technology—Unified Data Model—Kurtosys, URL https://www.kurtosys.com/technology, date retrieved on Oct. 9, 2015, 15 pages.

*Primary Examiner* — Alford W Kindred
*Assistant Examiner* — Cecile H Vo
(74) *Attorney, Agent, or Firm* — Kilpatrick Townsend & Stockton LLP

(57) ABSTRACT

Techniques are provided for creating a unified data model for entities in components of an access management system. A method can include identifying an entity of a component, identifying a first attribute metadata for the entity, creating a data type for the first attribute metadata of the entity, defining the entity in accordance with the created data type, and storing the defined entity in a unified storage.

22 Claims, 15 Drawing Sheets

(56) References Cited

U.S. PATENT DOCUMENTS

| | | | |
|---|---|---|---|
| 2010/0114897 A1* | 5/2010 | Polo-Malouvier | ........................... G06F 17/30592 707/741 |
| 2011/0178841 A1* | 7/2011 | Rane | ...................... G06Q 30/02 705/7.31 |
| 2014/0181003 A1* | 6/2014 | Kling | .................... G06F 16/254 707/600 |
| 2015/0205977 A1* | 7/2015 | Rundle | ............... G06F 21/6218 707/781 |
| 2016/0019272 A1* | 1/2016 | Liu | ....................... G06F 16/254 707/756 |
| 2016/0063100 A1* | 3/2016 | Anton | ................. G06F 16/2219 707/739 |
| 2016/0179982 A1* | 6/2016 | Dietrich | ............... G06Q 10/067 707/798 |

* cited by examiner

| /System/Config | /System/Admin | /System/SS | /System/Runtime | /System/View | /System/Monitor |
|---|---|---|---|---|---|
| • Topology<br>• Auth Plugins [Felix]<br>• ID store profiles<br>• Component<br>  — ESSO<br>  — SSO<br>  — Oauth | • Service Profiles<br>  — Federation<br>  — ESSO<br>  — STS<br>  — OAuth<br>  — SSO<br>  — OAAM | • App Accounts<br>• Impersonation<br>• Credentials<br>• Consents | • Sessions<br>• Entities<br>  — Users<br>  — Groups<br>  — Devices<br>  — IP<br>• Federation Data | • Applications<br>• Identities<br>  — Domains<br>  — Users/Groups<br>  — Partners<br>  — Clients<br>• Network | • Diagnostics<br>• Metrics |

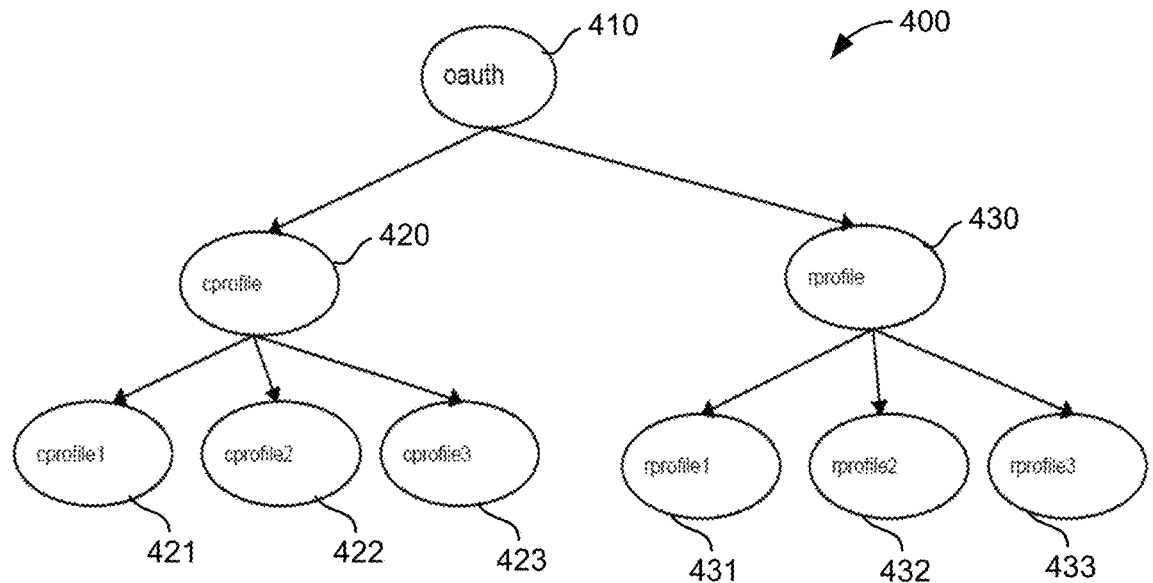

| /oauth | Root OAuth Entity created using EntityType having name and description attribute types. Act as root entity for OAuth |
|---|---|
| /oauth/cprofile | Client profile entity. Container entity for client profiles |
| /oauth/cprofile/cprofile1 | Client Profile instance entity with name cprofile1 |
| /oauth/cprofile/cprofile2 | Client Profile instance entity with name cprofile2 |
| /oauth/cprofile/cprofile3 | Client Profile instance entity with name cprofile3 |
| /oauth/rprofile | Resource profile entity. Container entity for Resource profiles |
| /oauth/rprofile/rprofile1 | Resource profile instance entity with name rprofile1 |
| /oauth/rprofile/rprofile2 | Resource profile instance entity with name rprofile2 |
| /oauth/rprofile/rprofile3 | Resource profile instance entity with name rprofile3 |

*FIG. 4*

Entity Journal

510
| Journal ID | Journal sequence number |
|---|---|
| Operation Time | Time of the journal creation |
| Server | Source Server ID of the journal |
| Description | Description |
| Entity Changes [1..N] | List of Entity changes |

Entity Changes

520
| Entity change sequence | Sequence number |
|---|---|
| Version | Version number |
| Journal Type | Journal Type [Entity or EntityType or EntityAttributeType] |
| Target Entity ID | Target Entity Unique ID |
| Target Entity NamePath | Target Entity Name Path |
| Object Operation | Operation [Add / Delete / Modify] |
| EntityAttributeChange [1..N] | List of Entity Attribute changes |

Entity Attribute Changes

530
| Attribute Name | Name of the attribute changed |
|---|---|
| Attribute Operation | Attribute change operation [Add/Replace/Delete] |
| Current Value [0..N] | Current values |

*FIG. 5*

EntityAdmin

710
| EntityManager getEntityManager() | Returns Entity Manager |
|---|---|
| EntityTypeManager getEntityTypeManager() | Returns Entity Type Manager |
| EntityJournalManager getEntityJournalManager() | Returns Entity Journal Manager |
| EntityAttributeTypeManager getEntityAttributeTypeManager() | Returns Entity Attribute type Manager |
| EntityAdminProvider getEntityAdminProvider() | Returns Entity Admin Provider |
| long getStoreVersionInUse() | Returns lastest Journal number |
| boolean applyBatch(EntityBatch entityBatch) | Apply Entity as a batch in a single transaction |
| addEntityChangeListener(EntityChangeListener listener) | Register entity change listener |
| removeEntityChangeListener(EntityChangeListener listener) | Remove registered entity change listener |

EntityRuntime

720
| EntityRuntimeProvider getEntityRuntimeProvider() | Returns Entity Runtime Provider |
|---|---|
| Entity getEntity(String namePathOrId, EntityManager.PARAM_OPTION option) | Returns Entity for the given Name Path or uniqueId |
| List<Entity> getEntities(String namePathOrId, EntityManager.PARAM_OPTION paramType, EntityManager.RETURN_OPTION returnType) | Returns Entities at one level or entire subtree for the given name path or unqiueId |
| List<Entity> getAllEntities() | Returns all entities |
| refreshEntities() | Refresh entities cache |

EntityAttributeTypeManager

730
| EntityAttributeType createEntityAttributeType(EntityAttributeType attributeType) | Create Entity Attribute type |
|---|---|
| modifyEntityAttributeTypeName(String originalName, EntityAttributeType attributeType) | Modify Entity Attribute type |
| modifyEntityAttributeType(EntityAttributeType attributeType) | Modify Entity attribute type |
| deleteEntityAttributeType(String attributeName) | Delete Entity attribute type |
| EntityAttributeType getEntityAttributeType(String attributeName) | Get Entity Attribute type |
| EntityAttributeType getNewEntityAttributeType(String attributeName) | Get new EntityAttribute type Object with UUID |
| List<EntityAttributeType> getAllEntityAttributeTypes() | Get all Entity Attribute Types |
| deleteAllEntityAttributeTypes() | Removes all Entity Attribute Types |

*FIG. 7A*

EntityTypeManager

| | |
|---|---|
| EntityType createEntity (EntityType entityType) | Create Entity type |
| modifyEntityTypeName(String originalName, EntityType entityType) | Modify Entity type |
| modifyEntityType(EntityType entityType) | Modify Entity type |
| deleteEntityType(String entityTypeName) | Delete Entity type |
| EntityType getEntityType(String entityTypeName) | Get Entity type |
| EntityAttributeType getNewEntityType(String name) | Get new EntityType Object with UUID |
| List<EntityType> getAllEntityTypes() | Get all Entity Types |
| deleteAllEntityTypes() | Removes all Entity Types |

740

EntityManager

| | |
|---|---|
| Entity createEntity(Entity entity) | Create Entity |
| modifyEntityName(String originalNamePath, Entity entity) | Modify Entity |
| modifyEntity(Entity entity) | Modify Entity |
| Entity getEntity(String namePathOrId, PARAM_OPTION option) | Get Entity with name path or uniqueId |
| Entity getNewEntity(String namePath) | Get Entity Instance with UUID populated |
| List<Entity> getEntities(String namePathOrId, PARAM_OPTION paramType, RETURN_OPTION returnType) | Get list of entity at one level or entire subtree for the given name path or uniqueId |
| List<Entity> getAllEntities() | Get all entities |
| deleteAllEntities() | Delete all entities |
| EntityTreeNode getEntityTreeNode(String namePath) | Get EntityTreeNode for the given name path |
| applyEntityJournal(EntityJournal entityJournal) | Apply Entity Journal |
| applyEntityJournal(String namePath, EntityJournal entityJournal) | Apply Entity Journal for the given name path |
| long getStoreVersionInUse() | Get latest journal sequence number |

750

EntityJournalManager

| | |
|---|---|
| EntityJournal createEntityJournal(EntityJournal journal) | Create Entity Journal |
| EntityJournal getEntityJournal(long journalId) | Get Entity Journal for the given journal Id |
| EntityJournal getFirstJournal() | Get latest Journal |
| List<EntityJournal> getJournals(long from, int maxCount) | Get Journals from journal and max count |
| long getJournalCount(long from) | Get Journal count from journal |

| NAME | DESCRIPTION | UNIQUE_ID |
|---|---|---|
| admin-roles | Admin Role Container | 07080e9c-77dd-4c2c-bfae-c3923ac69afc |
| Application Domain Administrator | | cd265d1b-93c8-4e3f-91c3-a445cf242b53 |
| /appdomain/0548da2b-9df9-4ac0-82de-585f5949c5ca | | 379f5ab2-7eee-41a9-8449-1fa58199c905 |
| admin-roles | Admin Role Container | edc65617-14a3-45b7-b7f7-ddb956621cc5 |
| Application Domain Administrator | | da3f791b-3c4d-43dc-86e7-4ae26fb856e |
| token-issuance-policies | Token Issuance Policy Container | 6a693b29-8ace-4d68-9760-63c441c4dd6e |
| Documents | | 3aec9da7-a41d-4ccd-b814-e27417313981 |
| authn-policies | Authentication Policy Container | 27406025-79e7-4498-a3ad-1a06490df60e |
| Protected Resource Policy | Policy set during domain creation. Add resources to this policy to protect them. | 4c3c703e-c2ac-449a-b086-03c7f64a68bd |
| Public Resource Policy | Policy set during domain creation. Add resources to this policy to allow anyone access. | 07a00b97-5105-43ad-a44c-c6f7fb60a529 |
| authz-policies | Authorization Policy Container | a8fdd4fe-d41a-4867-b088-e3bcea586930 |
| Protected Resource Policy | Policy set during domain creation. Add resources to this policy to protect them. | dff9781-b938-495b-b900-2ff5d25f0725 |
| Public Resource Policy | Policy set during domain creation. Add resources to this policy to allow anyone access. | 1452c207-2aeb-40e3-aa9c-ba0e6afde85 |
| resources | Resource Container | add36b75-2cc7-40b4-9f4b-44c2032a8624 |

*FIG. 11A*

Entity Attributes for OAM Policy resource : /policy/app-domains/EPRCS/resources/4c951b7d-8b9e-445b-94ea-9a79d5c2ed73 ⟵ 1110

| ID | ENTITY_ID | ATTR_NAME | ATTR_VALUES | ATTR_VALUES_SEQ |
|---|---|---|---|---|
| 26870 | 6766 | description | | 0 |
| 26871 | 6766 | resource-type | 132d19fa-2093-487c-aa1f-6e88db4a7e8f~ | 0 |
| 26872 | 6766 | application-domain | 8ecbb9ce-d228-48a4-a988-e100ff981909~ | 0 |
| 26873 | 6766 | resource-url | /../~ | 0 |
| 26874 | 6766 | query-string | | 0 |
| 26875 | 6766 | query-params | | 0 |
| 26876 | 6766 | host-identifier | 3e2698be-8d44-42a1-84f5-1a7f8eaa3feb~ | 0 |
| 26877 | 6766 | protection-level | PROTECTED~ | 0 |
| 26878 | 6766 | operations | | 0 |
| 26879 | 6766 | attributes | | 0 |

Entity Attributes for OAM Authentication Policy : /policy/app-domains/Fusion Apps Integration/authn-policies/Application SSO

| ID | ENTITY_ID | ATTR_NAME | ATTR_VALUES | ATTR_VALUES_SEQ |
|---|---|---|---|---|
| 312 | 143 | description | Fusion Application SSO using BASIC authentication~ | 0 |
| 313 | 143 | resources | ce686b8f-f67b-4200-80ca-3e694379991f~e2672ad-35f9-4840-8899-8 | 0 |
| 314 | 143 | default-authn-scher | cf32d637-e396-4ae9-9f39-ea53ca55eb83~ | 0 |
| 315 | 143 | success-responses | obmygroups:HEADER.$user.groups~uid.HEADER.$user.userid~ | 0 |
| 316 | 143 | failure-responses | | 0 |
| 317 | 143 | success-redirect-url | | 0 |
| 318 | 143 | failure-redirect-url | | 0 |
| 319 | 143 | is-enabled | true~ | 0 |
| 320 | 143 | is-default-authn-sch | false~ | 0 |
| 321 | 143 | checkpoints | | 0 |

| | NAME_PATH | TYPE_NAMES | JOURNAL_ID | VERSION | CREATOR |
|---|---|---|---|---|---|
| 1 | | | | | |
| 2 | /tenants/odecs4026/applications | ApplicationsContainer~ | 0 | 1 | anonymous |
| 3 | /tenants/odecs4026/clients | ClientsContainer~ | 0 | 1 | anonymous |
| 4 | /tenants/odecs4026/clients/oauth.lookup | OAuthLookupContainer~ | 0 | 1 | anonymous |
| 5 | /tenants/odecs4026/config | ConfigContainer~ | 0 | 1 | anonymous |
| 6 | /tenants/odecs4026/config/applicationTemplates | ApplicationTemplatesContainer~ | 0 | 1 | anonymous |
| 7 | /tenants/odecs4026/config/oauth | OAuthConfigContainer~ | 0 | 1 | anonymous |
| 8 | /tenants/odecs4026/config/oauth/OAuthAdaptiveAccessPlugin | OAuthConfigContainer~ | 0 | 1 | anonymous |

| | MODIFIER | CREATE_TIME_STAMP | MODIFY_TIME_STAMP | TAG | TRANSACTION_ID | NAME |
|---|---|---|---|---|---|---|
| 1 | | | | | | |
| 2 | | 2015-06-26 11:58:20 | | | | applications |
| 3 | | 2015-06-26 11:58:20 | | | | clients |
| 4 | | 2015-06-26 11:58:20 | | | | OAuth Client Lookup |
| 5 | | 2015-06-26 11:58:20 | | | | config |
| 6 | | 2015-06-26 11:58:20 | | | | applicationTemplates |
| 7 | | 2015-06-26 11:58:20 | | | | oauth |
| 8 | | 2015-06-26 11:58:20 | | | | OAuthAdaptiveAccessPlugin |

| | DESCRIPTION | UNIQUE_ID |
|---|---|---|
| 1 | | |
| 2 | Applications entry | fb9b57a3-6acc-45a9-9cd8-b910afdcafb0 |
| 3 | Clients entry | e4bc552d-ab52-49df-a0b8-12b7fb03f0e4 |
| 4 | OAuth entry lookup | 591d1137-89f6-4346-bdcb-2c0a38ac1a71 |
| 5 | Config entry | 7dc3a95f-1b46-42f2-a8c9-c2d8ccb32e35 |
| 6 | Application Templates entry | daacda97-d512-4049-a1a3-d7643f98c635 |
| 7 | OAuth Config Container | a296dc87-605a-425c-9573-e8da5d06186c |
| 8 | OAuth Config Container | 163104ec-d521-48b8-b23e-7b361868065d |

| ID | ENTITY_ID | ATTR_NAME | ATTR_VALUES | ATTR_VALUES_SEQ |
|---|---|---|---|---|
| 130309 | 64535 | data | {"allowMultipleResourceServers":"true","description" | 0 |
| 130310 | 64536 | data | OAuthSystemConfig Container~ | 0 |
| 130311 | 64537 | data | OAuthServiceProvider Container~ | 0 |
| 130312 | 64538 | data | OAuthAdaptiveAccessPlugin Container~ | 0 |
| 130313 | 64539 | data | OAuthTokenAttributesPlugin Container~ | 0 |
| 130314 | 64540 | data | OAuthMSMPlugin Container~ | 0 |
| 130315 | 64541 | data | OAuthJailBreakingDetectionPolicy Container~ | 0 |
| 130316 | 64542 | data | OAuthClient Container~ | 0 |
| 130317 | 64543 | data | OAuthSysComponent Container~ | 0 |
| 130318 | 64544 | data | OAuthResourceServerInterface Container~ | 0 |
| 130319 | 64545 | data | OAuthUserProfileResourceServer Container~ | 0 |
| 130320 | 64546 | data | OAuthUserConsentResourceServer Container~ | 0 |
| 130321 | 64547 | data | OAuthServiceProfile Container~ | 0 |

*FIG. 11D*

UNIFIED DATA MODEL

CROSS REFERENCE TO RELATED APPLICATION

This application claims the benefit of U.S. Provisional Application No. 62/245,581 entitled "UNIFIED DATA MODEL," filed on Oct. 23, 2015 in United States Patent and Trademark Office, the disclosure of which is incorporated by reference herein in its entirety.

BACKGROUND

The present disclosure generally relates to creating a unified data model (UDM). In particular, the disclosure relates to creating a unified data model for entities in components of an access management system, such as an Oracle Access Manager (OAM) system.

An identity management system (IDM) is an information system, or a set of technologies that can be used for enterprise or cross-network identity management. Identity management describes the management of individual identities, their authentication, authorization, roles, and privileges within or across system and enterprise boundaries with the goal of increasing security and productivity while decreasing cost, downtime, and repetitive tasks.

An access management system of an IDM system can include several components that provide access management related services. Examples of such components may include web access management, open authorization (OAuth), enterprise single-sign on (ESSO), identity propagation and federation, mobile and social sign-on, and adaptive access. An access management system may need to persistently store data about each component.

Some components can include data structures such as entities. An entity can be, for example, an employee or a department. An entity can include metadata regarding an employee or a department of a company. Each entity can include its own data, such as parameters and data structures. For example, an employee can include an employee name, age and department. A department can have a department group, department owner, etc. Therefore, entities in each of the components can have different data structures.

During runtime, the metadata for the components have to be stored and managed. A persistent layer can be written for each entity type. When a new component is added or removed, then the persistent layer would need to be modified. Further, the component data would have to be modified structurally from top to bottom. For example, from a presentation layer, application layer, business logic layer to persistent layer.

A traditional method of modeling persistent layer data is through entity relationships. The entities are stored in an entity relationship model. Each entity is represented as a table of data and the relationship between the entities is maintained through constraints. A constraint is for example, a rule or restriction placed on the entities.

With the traditional entity relationship model, when a new component is added, a new version of a product would be released that includes the new component, and the new component would need to be implemented in the entity relationship model. Developers would perform part of the implementation in a persistent layer and some developers would implement the new components in the business logic layer. The changes to the persistent layer and the business logic layer would be wired together and the product would be released. This process can be laborious and time-consuming.

SUMMARY

In accordance with exemplary embodiments, techniques are provided for creating a unified data model (UDM) for components of an access management system, such as an Oracle Access Manager (OAM) system. Metadata can be dynamically modeled, managed and customized as needed by a user.

In accordance with some embodiments, a method can include identifying, by a computer including a processor and a memory, an entity of a component, identifying a first attribute metadata for the entity, creating a data type for the first attribute metadata of the entity, defining the entity in accordance with the created data type, and storing the defined entity in a unified storage.

In accordance with some embodiments, the unified storage comprises an entity-attribute-value (EAV) data model that is a vertical database model.

In accordance with some embodiments, the entity comprises a hierarchical multi-part name.

In accordance with some embodiments, the hierarchical multi-part name comprises an address for accessing the first attribute metadata in the unified storage.

In accordance with some embodiments, the method further includes accessing the entity in the unified storage in accordance with the hierarchical multi-part name of the entity.

In accordance with some embodiments, the method further includes querying the unified storage for one or more entities of the component.

In accordance with some embodiments, the method further includes marking a transaction boundary that is a rollback position of the first attribute metadata for the entity.

In accordance with some embodiments, the method further includes partitioning the unified storage for each of a plurality of tenants.

In accordance with some embodiments, the unified storage is partitioned for each of the plurality of tenants according to a hierarchical multi-part name corresponding to each of the plurality of tenants.

In accordance with some embodiments, the defined entity comprises a name value pair.

In accordance with some embodiments, the data type for the first attribute metadata comprises one of a string value, a string array value, and a default value.

In accordance with some embodiments, a non-transitory computer-readable storage medium storing a plurality of instructions executable by one or more processors to cause the one or more processors to perform operations including identifying an entity of a component, identifying a first attribute metadata for the entity, creating a data type for the first attribute metadata of the entity, defining the entity in accordance with the created data type, and storing the defined entity in a unified storage.

In accordance with some embodiments, the system includes a memory; and one or more processors coupled to the memory and configured to identify an entity of a component, identify a first attribute metadata for the entity, create a data type for the first attribute metadata of the entity, define the entity in accordance with the created data type; and store the defined entity in a unified storage.

Therefore, in accordance with an exemplary embodiment, the entity structure or data structure of the access management system components can be unified into extendible and uniformly managed content. Further, creating and updating a reading of the data can be performed in a single storage. Also, physical or structural changes do not need to be performed.

In addition, the creation or addition of components and attributes of the components can be performed during runtime. Therefore, there is zero down time (ZDT) in the creation or addition of components and their attributes.

A component owner or user can define one or more entity types and one or more attributes for each of the entity types in order to create an instance of this type. Therefore, the component owner does not need determine the storage of data in the persistent layer.

Other exemplary embodiments are directed to electronic devices, and computer readable media, and systems associated with methods described herein.

A better understanding of the nature and advantages of the exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 2 illustrates aspects of a system architecture supporting a unified data model, in accordance with some example embodiments.

FIG. 4 illustrates an example of a hierarchical data model, in accordance with some example embodiments.

FIG. 5 illustrates change log metadata, in accordance with some example embodiments.

FIGS. 7A and 7B illustrate Application Programming Interfaces (APIs), in accordance with some example embodiments.

FIGS. 11A, 11B, 11C and 11D illustrate metadata stored in an access object store, in accordance with some example embodiments.

DETAILED DESCRIPTION

Figure 1:
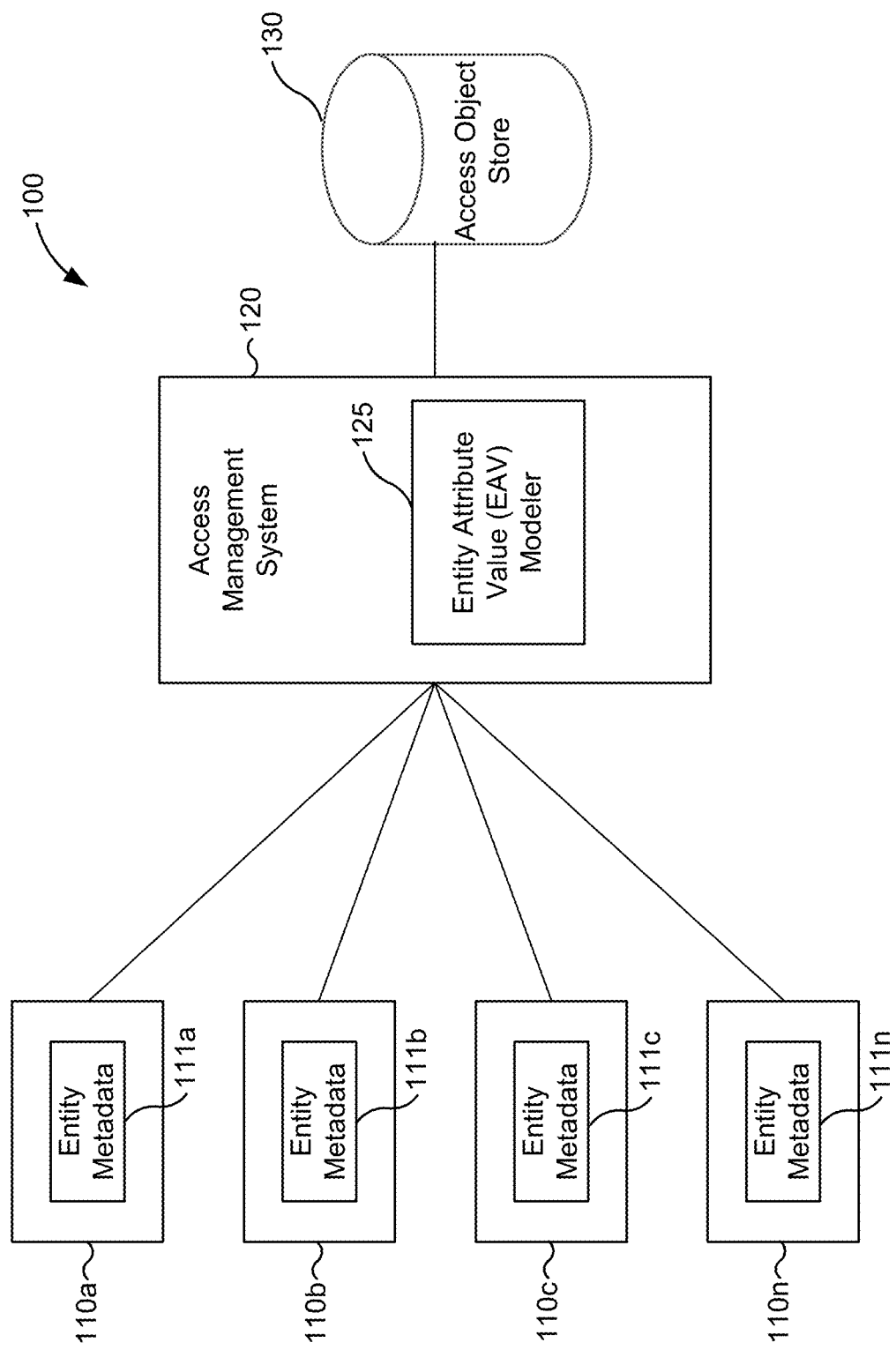
FIG. 1 illustrates a system for creating a unified data model (UDM), in accordance with some example embodiments.

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

An exemplary embodiment is directed to a unified data model (UDM) that can be implemented by components of an access management system, such as an Oracle Access Management system. A unified data model provides for a uniform storage of data. Components of an access management system can include web access management, open authorization (OAuth), enterprise single-sign on (ESSO), identity propagation and federation, mobile and social sign-on, and adaptive access to use a unified data model. A unified data model can help unify various persistent data of different access components to one single persistent store, such as an access object store. A unified data model can use, for example, an Entity-Attribute-Value (EAV) model (e.g. vertical database model). The UDM can vertically tie together the storage of metadata for components of the system.

In accordance with the example embodiments, a unified data model can include support for generic data modeling using various entity metadata such as validation metadata, presentation metadata, and grouping metadata. The metadata can let users interact with the system. A user can also be known as a customer, consumer, and/or component owner. Validation metadata can include a data type, a range of permissible values or membership in a set of values, a regular expression match, a default value, and whether the value is permitted to be null. Validation metadata can also record a class to which an attribute belongs.

Presentation metadata can include metadata regarding how the attribute is to be displayed to a user or consumer. For example, if the attribute is displayed as a text box, an image of specified dimensions, a pull-down list or a set of radio buttons). Attributes can be presented as part of a higher-order group, e.g., a specialty-specific form. Grouping metadata can include information such as the order in which attributes are presented. Certain presentation metadata, such as fonts and colors and the number of attributes displayed per row, can be applied to the group as a whole.

In accordance with the example embodiments, a unified data model framework can also include support for a hierarchical, multi-part naming system to set up a separate namespace for each entity created in the system, support for query capability, support for marking transaction boundaries, support for refreshing runtime data, support for change logs, support for multi datacenter replication using change logs, support for data center specific transformation rules while applying change logs, support for import/export of entity data from one system to other system, support for tenant isolation, support for highly scalable performance and concurrency with extensive performance tuning options, and support for performance monitoring, profiling and auditing.

A. Unified Data Model System

FIG. 1 illustrates a system for creating a unified data model (UDM), in accordance with some example embodiments.

The identity management system 100 can include components 110a, 110b, 100c-110n, access management system 120 and a storage 130. Components 110a, 110b, 100c-110n can include, for example, a web access management component, an enterprise single-sign on (ESSO) component, an open authorization component (OAuth), an identity propagation and federation component, a mobile and social sign-on component, and/or an adaptive access to use a unified data model component.

Enterprise single-sign on (ESSO) provides a unified sign-on and authentication across all of a user's enterprise resources, including desktops, client-server, custom, and host-based mainframe applications. Therefore, a user would only need to sign on once in order to access all of their resources.

OAuth allows users to share their private resources (e.g., photos, videos, contact lists, etc.) stored on one site with another site without having to hand out their credentials, typically supplying username and password tokens instead. Each token grants access to a specific site for specific resources and for a defined duration. This allows a user to grant a third party site access to their information stored with another service provider, without sharing their access permissions or the full extent of their data. For example, a token might grant access to a video editing site for videos from a specific album for the next two hours.

An identity propagation and federation component enables on-boarding of partners and service providers faster using industry security standards. Further, the identity propagation and federation component provides standards-based secure propagation of identity across applications and Web services.

A mobile and social sign-on component can deliver seamless single sign-on across native and Web applications on mobile devices. Further, a mobile and social sign-on component can enable low-value enterprise and consumer-facing applications to consume identities from social networks and other third-party identity providers using popular user-centric identity standards.

Adaptive access helps a customer to prevent fraud and misuse by strengthening existing authentication flows, evaluating the risk of events as they happen and providing risk-based interdiction mechanisms such as multi-factor out-of-band authentication. In operation with other components of the IDM system, adaptive access can reduce an enterprise's security exposure.

These are examples of components and the system 100 can include other types of components and can include more or fewer components that than shown in FIG. 1. Further, although components 110a, 110b, 110c-110n are shown as components of an access management system, they may be separate and independent from an access management system.

The components 110a, 110b, 110c-110n can include metadata for entities. For example, each of the components 110a, 110b, 110c, 110n can include one or more entity metadata 111a, 111b, 111c and 111n, respectively. An entity is a data structure that can include metadata regarding, for example, a policy (e.g. access policy data or authentication policy data), a resource server (e.g. characteristics), a protocol (e.g. Hypertext Transfer Protocol (HTTP) or Hypertext Transfer Protocol Secure (HTTPS)), a domain name (e.g. .dot or .com) and a context. An entity type is a data structure that can include metadata regarding, for example, a resource entity type, authentication policy entity type, resource server authentication policy entity type.

Entity metadata can include metadata regarding an entity such as a type of entity, an identifier of an entity, a name of the entity, etc. The metadata to be modeled can vary according to entities and components used by the client or customer. The entity metadata can contain name value pairs. For example, a name and a value. The name resource URL can include a value which is a URL address.

The access management system 120 may include an access manager. For example, an access manager can be an Oracle Access Manager (OAM). The access management system 120 can enable administrators to define authentication and authorization policies. The customer can install an access management system in the client environment. The data modeling can be performed by, for example, an administrator or security administrator of the access management system.

The access management system 120 can also include an Entity Attribute Value (EAV) modeler 125. An EAV model, also known as a vertical database model, is a data model that describes entities when the number of attributes (e.g. properties, parameters) that can be used to describe the entities is potentially large, but the number of attributes that will actually apply to a given entity is small.

By using the EAV modeler 125, attributes can be added and changed, and the data model does not have to be redesigned. For example, if another attribute is to be added, then another row can be added to a table representing an entity and the structure of the table does not need to be changed. The EAV modeler 125 can be a modeling tool that is used by an administrator or an authorized user. Components, including their entities and attributes, can be added or changed using, for example, programming commands on a user interface for the EAV modeler 125. Alternatively, data files can be used by the EAV modeler 125 to make or add changes to components and their entities and attributes.

The EAV modeler 125 can be used to unify the entity metadata of a component. For example, for an entity such as an employee, the instance of the employee data can be stored in different formats. One format is the header row which is called the entity ID. The entity ID captures metadata of that entity instance, such as an ID and the type of entity. Each attribute of that entity can be stored in another form table as a row. Therefore, if additional attributes are to be added to the entity, the existing data does not need to be changed. Specifically, the structure of the tables do not need to be changed, since each attribute is stored as a row and additional rows for attributes can be added.

Further, the EAV modeler 125 can be used to create a transparent persistent layer. That is, a persistent layer that can provide an interface to information storage mechanisms, such as a database.

New entity types can be added and defined and can include validation information. The system 100 can automatically adapt to the new entity type and the system 100 can store and retrieve the data to the new format. New entity guides can be defined by storing the data vertically and the data can grow or decrease in size dynamically. Therefore, when a new component is added, the component can specify its entity types and entity instance data for the entity types and the component can be added to the UDM.

The data that is unified by the EAV modeler 125 can be stored in storage. The storage can be a unified data store and can be known as an access object store 130. An access object store is, for example, a database, file or directory server. Access object store 130 can store access policies for each of the components, policy data, artifact data, plug-in information, etc. An access policy can define a way that a resource (e.g., HTTP URLs) is protected. An access policy can also be defined for every resource. For example, a first resource (e.g., HTTP URL) may be publicly accessible and does not need to be protected whereas another resource (e.g., HTTP URL) needs to be protected. The resource can be protected by requiring a user name and password, a certificate, a single use password, a single password authentication, etc.

Therefore, instead of storing and linking data of different formats, all of the information (e.g. source server, authentication policies, how the resource is linked with the authentication policy) can be modelled as an entity type, such as, a resource entity type, an authentication policy entity type, resource server authentication policy type, and stored in accordance with a unified data model.

FIG. 2 illustrates aspects of a system architecture supporting a unified data model, in accordance with some example embodiments. Specifically, FIG. 2 shows various entities, their attributes, their values and the path that can be used in order to access the entities in the system 100. The entities can be identified and modelled as a name-parts-lists-attribute (e.g., a key value pair for an attribute and its value).

As shown in FIG. 2, a hierarchical multi-part naming can be used to identify the system architecture requirements. For example, the name "/System/Config" can include configuration related entries. Configurations can include topology, authentication plugins, ID store profiles, etc. Therefore, each entity can be accessed using, for example, the multi-part naming.

B. Metadata Modeling to Create a Unified Data Model

A generic data model using metadata can help a consumer or user of a unified data model (UDM) framework to interact with an access object store in terms of a logical schema rather than a physical schema. UDM framework consults the metadata for various operations like data presentation, interactive validation, bulk data extraction and ad-hoc query. The metadata can be used to customize the behavior of the system. UDM framework has trade off simplicity in the physical and logical structure of the data for the complexity in their metadata.

Figure 3:
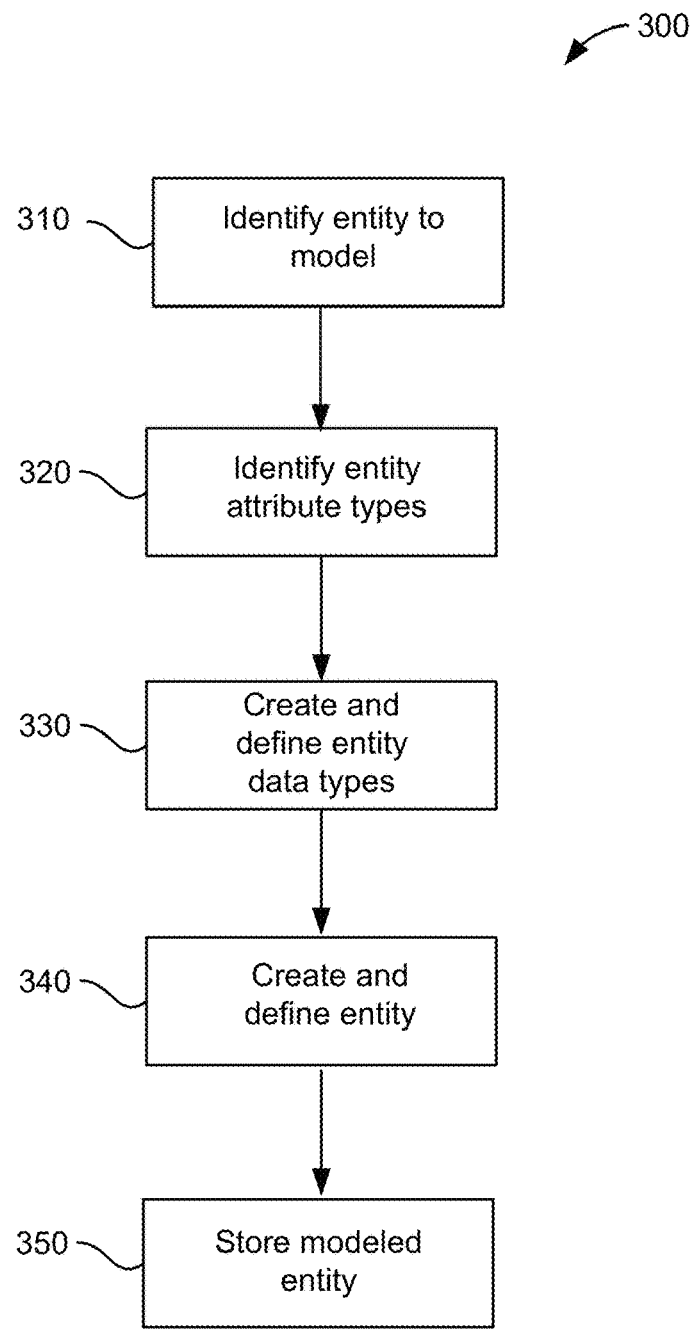
FIG. 3 illustrates a flowchart for creating a unified data model, in accordance with some example embodiments.

FIG. 3 illustrates a flowchart for creating a unified data model, in accordance with some example embodiments. The components of the access management system can each include particular metadata. The metadata of the components can be structured using the attributes of the entities.

At step 310, an entity to be modeled is identified. An entity can be based on the component that is being used by the user. In addition, the entities can be based on the data that is used by the user. For example, an entity can be a resource, an authentication scheme, etc. A resource can be a uniform resource locator (URL) for a website. The entities to be defined can be present according to the particular component being used.

At step 320, after the entity to be modeled is identified, the attribute types for the entity can be identified. For example, with the resource entity, the attribute types can include resource name, protocol information (e.g., HTTP, HTTPS, etc.), resource URL (e.g., an address for the resource), and operations supported by the resource (e.g., get, post, delete, etc.). These are the attribute types needed to create a resource.

At step 330, after the attribute types for the entity are identified, data types for the attribute types are identified and/or defined. A data type can be a single-value or multi-value. A default value for the attribute can also be created. For example, a user can set an attribute to correspond to a predetermined value. Further, an attribute can be defined to include a validation requirement.

For example, the protocol information attribute type (e.g., HTTP or HTTPS) can have a string data type. Therefore, the protocol attribute type is defined to have a string value corresponding to HTTP or HTTPS. If a string data type has been previously defined as a possible value for an attribute type, the string value that was previously defined can be used as a value for the protocol information attribute type. With, for example, resource URL, it is a simple string such as a data type java string With, for example, the resource operations attribute type, the resource operations can include get, post, delete, etc. That is, more than one string is supported. Therefore, the data type for the resource operations can be a string array which is a list of strings or an array of strings.

At step 340, after the data types for the attribute types have been defined and/or identified, the entity type is created and defined. For the resource entity, the resource type name is the name of the resource and the resource data types are mapped according to the data types that were defined and/or identified. Therefore, name value pairs are created for each of the entities. That is, for a name "resource URL" a value that is the URL address is created. As new entity types are created, they can be defined as discussed above.

After the entity type is defined, at step 350, the mapped entity type is stored in a storage, such as an access object store. The mapped information for the resource entity type can be stored. Therefore, all of the data can be stored in a uniform manner. Further, all of the information is readily available in a single location.

FIGS. 11A, 11B, 11C and 11D illustrate metadata stored in an access object store, in accordance with some example embodiments. The metadata is stored in an access object store in accordance with the unified data model discussed above. The access object store can correspond to access object store 130 discussed above. Access object store 130 can be stored locally at a client installation of the access management system. That is, the access object store is in a client environment of the access management system. The access object store can store information for all of the entities needed for a particular user.

A unified data model can include, for example, access manager (e.g., Oracle® Access Manager (OAM)) policy entity metadata, access manager policy attribute metadata, open authorization (OAuth) configuration entity metadata and open authorization configuration attribute metadata. FIG. 11A shows an example of access manager policy entity metadata 1100 and FIG. 11B shows an example of access manager policy attribute metadata 1110. As shown in FIG. 11A, the access manager policy entity metadata stored in accordance with a unified data model can include a name (e.g., NAME), description (e.g., DESCRIPTION) and a unique ID (e.g., UNIQUE_ID). As shown in FIG. 11B, the access manager policy attribute metadata stored in accordance with the unified data model can include an ID, an entity ID (e.g., ENTITY_ID), and attribute name (e.g., ATTR_NAME), attribute values (e.g., ATTR_VALUES), and an attribute value sequence (e.g., ATTR_VALUES SEQ). Attribute values are stored as encoded value in 'value' column, which can go beyond 4000 characters. However, since a database table may have a max character limit (e.g. 4000 character limit on table column) the UDM will split the attribute values to multiple chunks of 4000 characters and store it in multiple rows with an appropriate sequence number. The metadata 1100 and 1110 shown in FIGS. 11A and 11B are merely examples of access manager policy metadata stored in accordance with a unified data model as disclosed in the example embodiments.

FIG. 11C shows open authorization (OAuth) configuration entity metadata 1120 and FIG. 11D shows open authorization configuration attribute metadata 1130. As shown in FIG. 11C, the open authorization configuration entity metadata stored in accordance with a unified data model can include a name path (e.g., NAME_PATH), name type (e.g., TYPE_NAMES), journal ID version (e.g., JOURNAL_ID_VERSION), creator information (e.g., CREATOR), modifier information (e.g., MODIFIER), a creation time stamp (e.g., CREATE_TIME_STAMP), a modification time stamp (e.g., MODIFY_TIME_STAMP), a tag (e.g., TAG), a transaction ID (e.g., TRANSACTION_ID), a name (e.g., NAME), a description (e.g., DESCRIPTION) and a unique ID (e.g., UNIQUE_ID). NAME_PATH can use '/' separated hierarchical names to uniquely identify an entity, TYPE_NAMES can include a list of entity type to which an entity belongs, JOURNAL_ID can be a change log reference for an entity, VERSION can be a current version of an entity, CREATOR can be creator information, MODIFIER can be modifier information, CREATE_TIME_STAMP is a creation time stamp, MODIFY_TIME_STAMP is a modification time stamp, TAG can be a tag string to group entities, TRANSACTION_ID can be a reference for tracking an entity's transaction, NAME can be a name of an entity, DESCRIPTION can be a description of the entity, and UNIQUE_ID can be a unique ID of the entity.

As shown in FIG. 11D, the open authorization configuration attribute metadata stored in accordance with the unified data model can include an ID, an entity ID (e.g., ENTITY_ID), and attribute name (e.g., ATTR_NAME), attribute values (e.g., ATTR_VALUES), and an attribute value sequence (e.g., ATTR_VALUES SEQ). The metadata 1120 and 1130 shown in FIGS. 11C and 11D are merely examples of open authorization configuration metadata stored in a unified data model. The metadata can vary in accordance with, for example, the components and data used by the user.

Therefore, information (e.g. source server, authentication policies, how the resource is linked with the authentication policy) can be modelled as an entity type and stored in accordance with a unified data model.

The entity can include system attributes such as when the entity was created, when the entity was updated, who is the user who is creating the entity and who is the user who is modifying the entity. These attributes can be created automatically by the system. Further, there can be multiple instances of a resource entity type.

The steps described above are merely examples, and the order of the steps and elements of the steps can be changed. An entity and its attributes can be created by, for example, a data modeler which can be a modelling tool. The entities can be created and configured by, for example, an administrator of the access management system. An administrator can define the entities using, for example, a modeling tool.

Different types of data are used to create a unified data model of a component. The data can include entity attribute type metadata, entity type metadata, entity attribute, system attribute, and entity.

For purposes of explanation, data modeling in order to create a unified data model is described with respect to a component open authorization (OAuth) below.

1. Entity Attribute Type Metadata

As shown in the Table 1 below, an entity attribute type can act as a validation and presentation metadata. Validation metadata can include a data type, a range of permissible values or membership in a set of values, a regular expression match, a default value, and whether the value is permitted to be null. Validation metadata can also record a class to which an attribute belongs.

Presentation metadata can include metadata regarding how the attribute is to be displayed to a user or consumer. For example, if the attribute is displayed as a text box, an image of specified dimensions, a pull-down list or a set of radio buttons). Attributes can be presented as part of a higher-order group, e.g., a specialty-specific form. Certain presentation metadata, such as fonts and colors and the number of attributes displayed per row, can be applied to the group as a whole.

TABLE 1

| Name | Attribute type name |
|---|---|
| Description | Description of the attribute type |
| Unique ID | Unique identifier |
| Data type | Data type of the attribute |
| Widget type | UI widget type |
| Default value | Default value |
| Validation rule | Validation rule |

An attribute type name can be unique across components. A consumer or user of the UDM can define and create the entity attribute types required for their entity model. Each attribute type name can have prefix as a component name in order to avoid collision with other components. For example, a component 'OAuth', can create attribute type names with 'OAuth' as a prefix to their attribute type name. A unique ID can be generated by the UDM to support name modification and export/import of attribute types across data centers. Data centers can be set up for scalability across various geo-locations. Further, data centers can be used for data recovery. The data type defines the data type of the attribute.

2. Entity Type Metadata

Entity type metadata can act as grouping metadata, as shown in the Table 2 below.

TABLE 2

| Name | Entity type name |
|---|---|
| Description | Description of the entity type |
| Unique ID | Unique identifier |
| Attribute Type Names {0..N} | List of supported entity attribute type names |
| Key Attribute Name | Key to uniquely identify the entity |

An entity type name can be unique across components. A consumer or user of the UDM can define and create entity types for the user's entity model. Each entity type name can have a prefix, such as a component name, in order to avoid collision with other components. For example, a component 'OAuth,' can create entity type names with 'OAuth' as prefix to their entity type name. A unique ID can be generated by the UDM to support name modification and export/import of attribute types across data centers. A data type can define the data type of the attribute.

3. Entity Attribute

An entity attribute can hold an entity attribute name and an entity attribute value, as shown in Table 3 below. An attribute name can be the name of an existing entity attribute type.

TABLE 3

| Attribute Name | Valid entity attribute name |
|---|---|
| Attribute Values [0..N] | List of entity attribute values |

4. System Attribute

A system attribute, as shown in Table 4 below, can be a special entity attribute. A system attribute can be available to capture audit data at an entity level. Further, a system attribute can be optional for the consumer of the UDM.

TABLE 4

| | |
|---|---|
| Version | Version of the entity |
| Creator | Created by |
| Modifier | Modified by |
| Create Timestamp | Created at timestamp |
| Modify Timestamp | Modifed at timestamp |
| Tag | Special tag to run ad-hoc query |
| Transaction ID | Transaction ID to mark transaction boundary |

5. Entity

Entity data is the persistent data and can contain a name path, a list of entity attributes and a system attribute, as shown in Table 5.

TABLE 5

| | |
|---|---|
| Name | Entity name |
| Description | Description of the entity |
| Unique ID | Unique Identifier |
| Name Path | Hierarchical, multi-part namespace |
| Entity Types (1..N) | Instance of entity types |
| Entity Attribute (0..N) | List of Entity Attributes as given in the above table |
| System Attribute | System attribute to capture audit data |
| Journal ID | Change Log event Id |

C. Hierarchical, Multi-Part Naming System

Each entity that is created in the system can have a hierarchical, multi-part naming in order to set up a separate namespace for each entity. A name path of the entity can be used for the entity. The UDM can provide for validation and retrieval of the hierarchical entity.

FIG. 4 illustrates an example of a hierarchical data model, in accordance with an embodiment. The hierarchical data model 400 shown in FIG. 4 is for a component 'OAuth.' The hierarchical data model 400 can include entities 410, 420, 430, 421, 422, 423, 431, 432 and 433.

A component OAuth can be entity 410. Entity 420 can correspond to, for example, a client profile ("cprofile") and entity 430 can correspond to a resource profile ("rprofile"). Entity 420 can include instance entities 421, 422 and 423. Entity 430 can include instance entities 431, 432, and 433. A table 440 describes the features of each of the entities shown in the hierarchical data model 400. The elements shown in FIG. 4 are merely examples and there can be more entities and one or more instances for each of the entities in accordance with the component being modelled and the data used by user.

For the component OAuth, attributes names are created with "OAuth" as a prefix. Entity attribute types can be reused. So if there are different components that have, for example, "name" as an attribute entity type, the attribute "name" can be a reusable entity attribute type. So every component in an identity management system, such as OAuth, does not have to create the entity attribute type.

However, there are some attributes that are specific to a component. Therefore, the name of the components can be predicted and added. If the attribute is pre-fixed, that indicates that the attribute is a component-specific attribute type and other components should not use it when they are defining their entity types. If an attribute is not pre-fixed, then the attribute can be reused by other components.

The component OAuth 410 can be accessed with a name part. All of the artifacts or documents related to OAuth can be stored under an OAuth name part.

Entity 420 can be a client profile. The client profile of entity 420 can be stored under the OAuth component entity 410. There can be one or more instances of a client profile of entity 420 such as cprofile1 instance entity 421, cprofile2 instance entity 422, and cprofile3 instance entity 423.

Entity 430 can be a resource profile. The resource profile of entity 430 can be stored under the OAuth component entity 410. There can be one or more instances of a resource profile of entity 430 such as rprofile1 instance entity 431, rprofile2 instance entity 432, and rprofile3 instance entity 433.

Although client profile and resource profile are shown in FIG. 4, this is merely an example, and other types of entities can be used.

After the final leaf nodes of the hierarchical data model 400 are created, a key value pair can be created. Therefore, a user can parse the name parts in order to obtain the right tree node in order to collect an attribute to return to a user.

D. Composition in Entity Data

For entity data which has a composite relationship with other entity data, the UDM can have such entity data as part of the parent entity data itself. Composite relationships are relationship between two entities, such that if the source/parent entity is removed or modified, automatically the related child entities will be removed/modified. The child entity may not exist on its own. Entity utility application programming interfaces (APIs) can be used to encode composite entity data as a parent entity data attribute value. For example, an access policy can be a composite data structure since it references other entities (e.g., a resource, authentication schema, etc.). As shown below, in example 1, "customerType" is composite entity data that goes within the customer entity 'C1'.

```
Customer C1 => <name, Oracle>
               <customerType, ["retail","101","20"]>
```

Example 1

E. Association in Entity Data

For entity data which have an associative relationship with other entity data, the UDM can have such entity data be created as a separate entity and the associative relationship can be established using the unique identifier of the entity with the related entity's attribute value. Associative relationships are relationship between two entities, such that both entities can exist on their own. The removal or modification of one entity will not affect other entity. As shown below in example 2, "Address" is associated with "Customer." Both entities (e.g. Address and Customer) exist independently and are associated using a unique identifier.

```
Address C1 => <address1, 200 Oracle Parkway>
Customer C1 => <billingAddress, address1>
                <shippingAddress, address1>
```

Example 2

F. Query Capability

A UDM according to an exemplary embodiment can provide extensive query capability of entities, as shown in Table 6. If a consumer would like to go back to a previous tree model, the consumer can conduct a query to obtain all of the entities under a component. For example, a consumer can request to obtain the entities under the component entity OAuth 410 shown in FIG. 4.

If a user would like to return a resource R, then the entire name part can be parsed. For example, the name part "OAuth/rprofile/rprofile2" can be parsed in order to return a particular resource R. Alternatively, if the unique ID of the entity is known, then the user can search according to the unique ID of the entity.

TABLE 6

| | |
|---|---|
| Get all entities | Retrieve all the entities |
| Get entities based on Name path and with option of entire sub tree or one level | Retrieve subtree or one level of entities based on Name path. |
| Get entity based on the unique identifier | Return entity for the given unique identifier |
| Get entity based on the name path [One level] | Return entity for the given name path |

G. Transaction Boundaries

The persistence layer is an underlying persistence store and atomicity, consistency, integrity, and durability (ACID) can be maintained with the persistent data. Therefore, according to an exemplary embodiment, all operations under this framework are atomic. For example, if a resource server profile is created and an authentication policy is created, if an exception occurs while the authentication policy is being created, the system according to an exemplary embodiment can ensure that the operation is atomic. The resource server creation can be rolled back. Therefore, the consumer can mark their boundary and can ensure that the data is atomic. There will not be any inconsistent data or an inconsistent leaf.

As shown in Table 7, a UDM according to an exemplary embodiment can provide a way for the consumer to mark the transaction boundaries for the create, read, modify and delete operation. The transaction boundary can be used to ensure that either the transaction saves or rolls back as a unit of work.

TABLE 7

| | |
|---|---|
| Begin Entity Session | Mark the start of the transaction boundary |
| End Entity Session | Marks the end of the transaction boundary. |

H. Refreshing Runtime Data

As shown in Table 8, the UDM can provide a runtime API to refresh runtime data of a consumer. In an example embodiment, the UDM may not provide change notification support by itself. A consumer can notify its runtime to refresh its runtime data from, for example, the access object store. The UDM can provide a refresh API to refresh the data of the UDM. UDM maintains change logs for each add/delete/modify. UDM also publishes notifications for the changes from administration server to managed servers. These notifications are consumed by managed servers and the manages servers call a refresh API to refresh the data in the managed servers.

When a change occurs in an administrator server node, a runtime server node can receive a notification and can refresh the data by itself. The changes can be propagated to the runtime server in order for the changes to be enforced.

TABLE 8

| | |
|---|---|
| Get entities based on Name path and with option of entire sub tree or one level | Retrieve subtree or one level of entities based on Name path. |
| Refresh entity data | Refreshes entity data caches |

I. Change Logs

FIG. 5 illustrates change log metadata, in accordance with some embodiments. An Entity Journal 510, Entity Changes 520, and Entity Attribute Changes 530 can be used. The UDM can generate entity changes for create, update and delete entity operations. These entity changes can be bundled as an "Entity Journal" on successful commit of the transaction. Change logs can be an implicit operation.

Multi-data center based topologies can be supported. A same set of access manager products can be installed in different regions (e.g. North America, Asia, etc.), however, the policies for the products in the different regions can be managed by a centralized data center. Therefore, if changes are made, the changes should be propagated from administrator servers to runtime nodes and to administrator servers in other regions.

A change that happens on an entity can be recorded as the change log in the change log storage. Change logs can be stored in JOURNAL and JOURNAL_CHANGES DB tables. The change log can be tracked using a general ID and for example, a change sequence. The changes can be pushed to other data centers and the change logs can be replaced so that the state of entities in other data centers can be equivalent to the changes made at the primary data center. Therefore, any creation, updating, deleting of an entity can be propagated to other data centers who are sharing the same access management system components.

J. Multi-Data Center Support

In accordance with an example embodiment, as shown in Table 9, an access manager replication agreement can be set up to use the UDM to automate the synchronization of data across data centers. Replication manager can pool for changes from an access object store and can use the UDM API to replicate the changes.

TABLE 9

| | |
|---|---|
| Apply Entity Journal | Applies the entity changes in the entity journal in single transaction |

K. Clone Datacenter Entity Change Listener

As shown in Table 10, in a multi-data center, the UDM can use OAM Replication setup to pull entity changes from a master data center. A consumer of the UDM can provide implementation in order to receive a notification on entity changes and can register the entity changes with the UDM using the name paths.

TABLE 10

| | |
|---|---|
| entityChanged | UDM invokes this method on matched registered entity change listener when there is an entity change by MDC OAM Replication setup |
| getRegisteredNamePaths | Interested name paths to get notification |

L. Import/Export

In an example embodiment, the UDM can support import/export of entity metadata and data as a DataBase File (DBF) from one system to another system. Although a DBF is described, other file types can be used, such as XML.

The import/export is performed at the entity level and a binary file can be transported and used to update the persistent store.

M. Multi-Tenant Isolation

Figure 6:
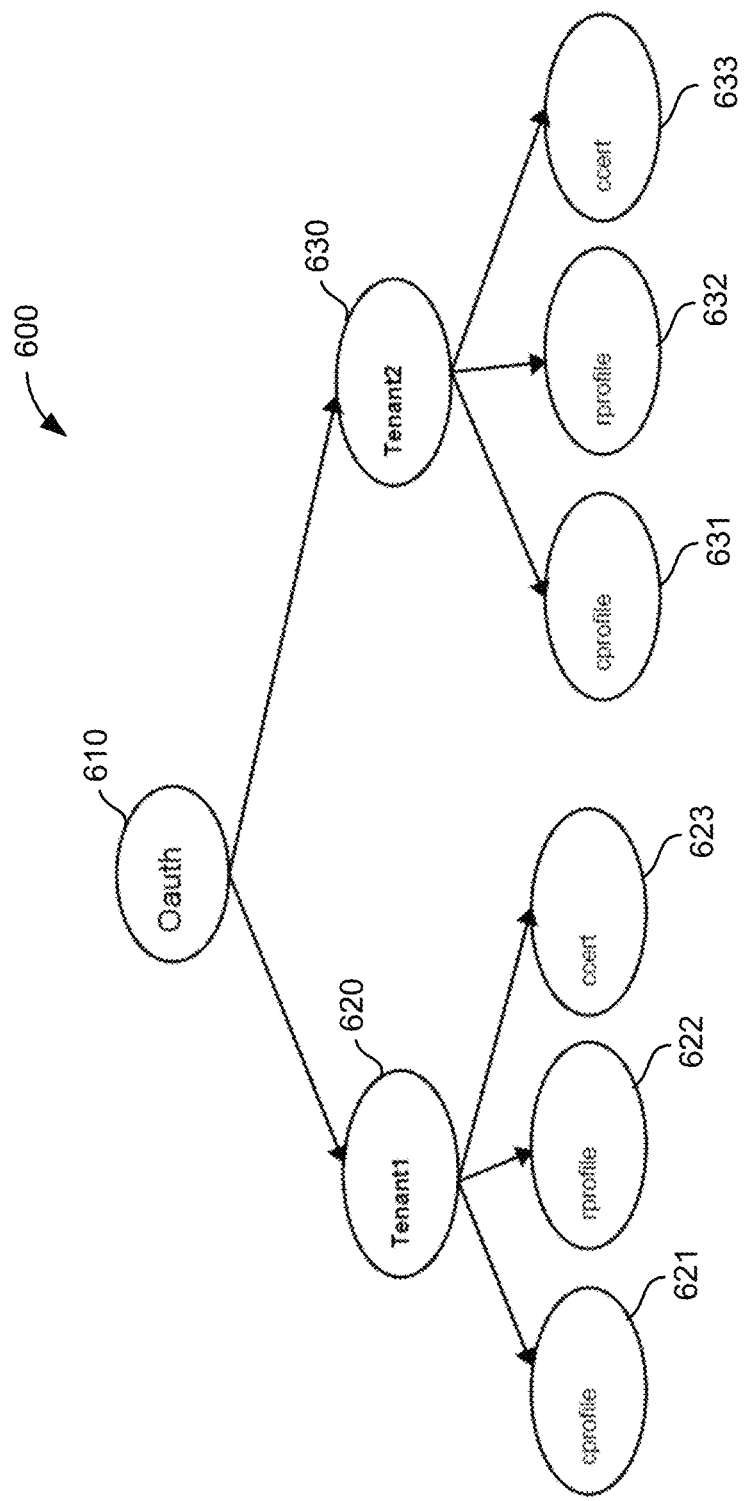
FIG. 6 illustrates a hierarchical data model supporting tenant isolation, in accordance with some example embodiments.

Further, an example embodiment can support multiple tenants. FIG. 6 illustrates a hierarchical data model 600 supporting tenant isolation, in accordance with an embodiment. As shown in FIG. 6, the UDM can support tenant isolation using, for example, a hierarchical, multi part naming system. By supporting multi-tenant isolation, multiple tenants can use the access management system, however, data that is specific to each tenant can be isolated from other tenants.

FIG. 6 shows an example of 'OAuth' multi-tenant isolation. The hierarchical data model 600 can include entities 610, 620, 630, 621, 622, 623, 631, 632 and 633.

A component OAuth can be entity 610. Entity 620 can correspond to, for example, a first tenant profile ("Tenant1") and entity 630 can correspond to a second tenant ("Tenant 2"). The first tenant and the second tenant can belong to a same user or the first tenant and the second tenant can belong to different users.

Entity 620 can include entities 621, 622 and 623. Entity 630 can include entities 631, 632, and 633. Entity 621 can be a client profile, entity 622 can be a resource profile and entity 623 can be a client cert for the Tenant1 620. Entity 631 can be a client profile, entity 632 can be a resource profile and entity 633 can be a client cert for the Tenant2 630. The elements shown in FIG. 6 are merely examples and there can be more or different entities and one or more instances for each of the entities.

The data can be stored per tenant since the database supports partitioning. The data is being stored at the tenant level. The data for teach of the tenants is isolated per tenant container. Artifacts or documents can be isolated per tenant. Therefore, tenant 1 cannot access the data of tenant 2, and tenant 2 cannot access the data of tenant 1.

In an example embodiment, an access manager configuration service can use an access object store as a shadow store. For example, for an access manager configuration service, an XML file can be a primary store and all of the read/write operations can happen on XML file first. Subsequently, the same operation will happen on UDM therefore it is called a shadow store. A configuration service can write any changes to a file system (e.g., oam-config.xml). A configuration service can have an entity provider to store the configuration changes to access object store.

FIGS. 7A and 7B illustrate Application Programming Interfaces (APIs), according to exemplary embodiments. API's according to the exemplary embodiments can include the examples shown in 7A and 7B. The APIs can be for EntityAdmin 710, EntityRuntime 720, EntityAttributeTypeManager 730, EntityTypeManager 740, EntityManager 750 and EntityJournal Manager 760.

Further, in accordance with some embodiments, there can be namespace collision validation. The UDM can provide support for component specific namespace registration.

L. Computer System

Figure 8:
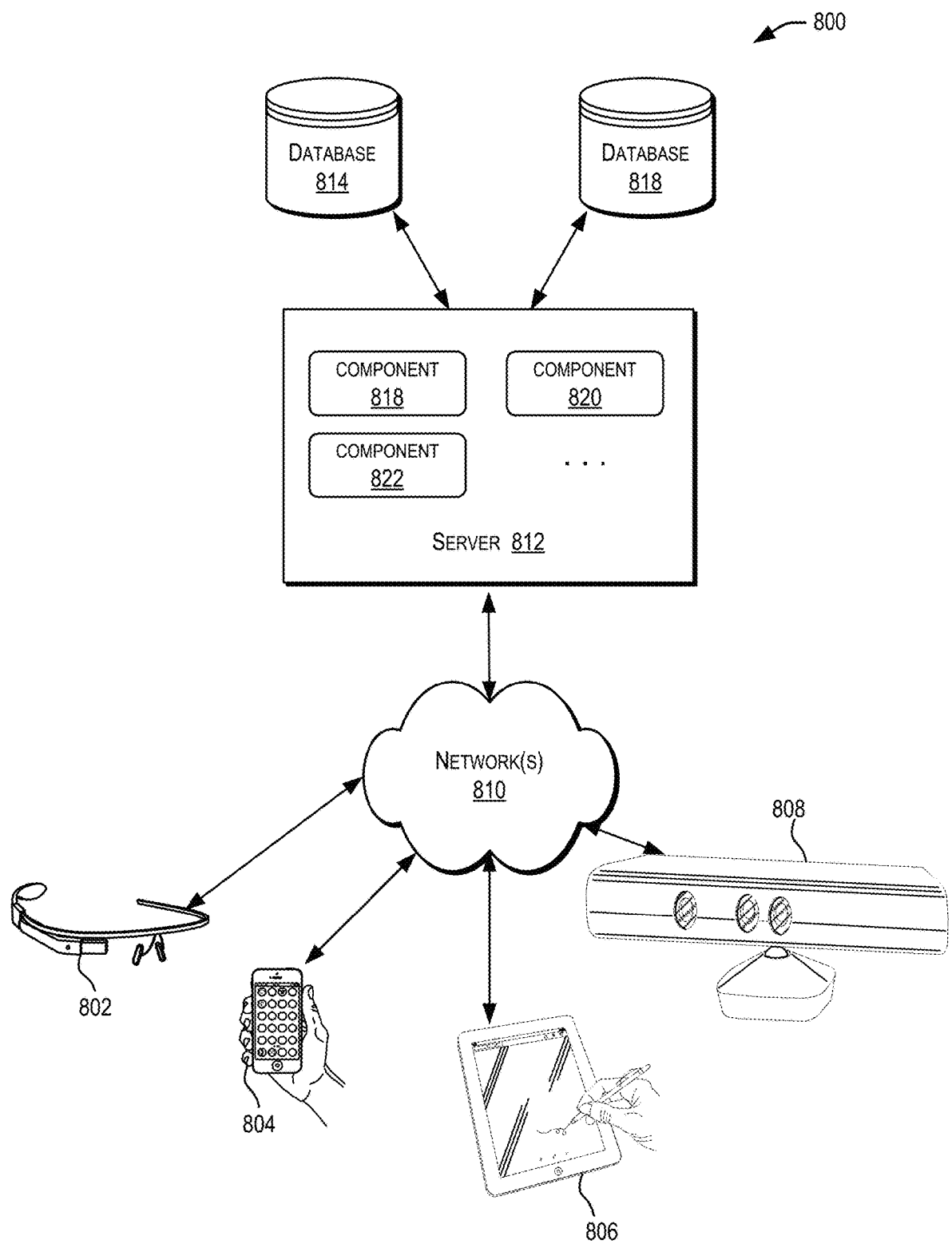
FIG. 8 depicts a simplified diagram of a distributed system for implementing an embodiment.

FIG. 8 depicts a simplified diagram of a distributed system 800 for implementing an embodiment. In the illustrated embodiment, the distributed system 800 includes one or more client computing devices 802, 804, 806, and 808, which are configured to execute and operate a client application such as a web browser, proprietary client (e.g., Oracle Forms), or the like over one or more network(s) 810. The server 812 may be communicatively coupled with the remote client computing devices 802, 804, 806, and 808 via network 810.

In various embodiments, the server 812 may be adapted to run one or more services or software applications such as services and applications that provide message delivery services. In certain embodiments, the server 812 may also provide other services or software applications can include non-virtual and virtual environments. In some embodiments, these services may be offered as web-based or cloud services or under a Software as a Service (SaaS) model to the users of the client computing devices 802, 804, 806, and/or 808. Users operating the client computing devices 802, 804, 806, and/or 808 may in turn utilize one or more client applications to interact with the server 812 to utilize the services provided by these components.

In the configuration depicted in FIG. 8, the software components 818, 820 and 822 of system 800 are shown as being implemented on the server 812. In other embodiments, one or more of the components of the system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

The client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 810.

Although distributed system 800 in FIG. 8 is shown with four client computing devices, any number of client computing devices may be supported. Other devices, such as devices with sensors, etc., may interact with the server 812.

The network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization. One or more flexible pools of logical storage devices can be virtualized to maintain virtual storage devices for the server. Virtual networks can be controlled by the server 812 using software defined networking. In various embodiments, the server 812 may be adapted to run one or more services or software applications described in the foregoing disclosure. For example, the server 812 may correspond to a server for performing processing as described above according to an embodiment of the present disclosure.

The server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 812 may include one or more applications to analyze and consolidate data feeds and/or event updates received from users of the client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 812 may also include one or more applications to display the data feeds and/or real-time events via one or more display devices of the client computing devices 802, 804, 806, and 808.

The distributed system 800 may also include one or more databases 814 and 816. These databases may provide a mechanism for storing information such as inventory information, and other information used by the example embodiments. Databases 814 and 816 may reside in a variety of locations. By way of example, one or more of databases 814 and 816 may reside on a non-transitory storage medium local to (and/or resident in) the server 812. Alternatively, the databases 814 and 816 may be remote from the server 812 and in communication with the server 812 via a network-based or dedicated connection. In one set of embodiments, the databases 814 and 816 may reside in a storage-area network (SAN). Similarly, any necessary files for performing the functions attributed to the server 812 may be stored locally on the server 812 and/or remotely, as appropriate. In one set of embodiments, the databases 814 and 816 may include relational databases, such as databases provided by Oracle, that are adapted to store, update, and retrieve data in response to SQL-formatted commands.

Figure 9:
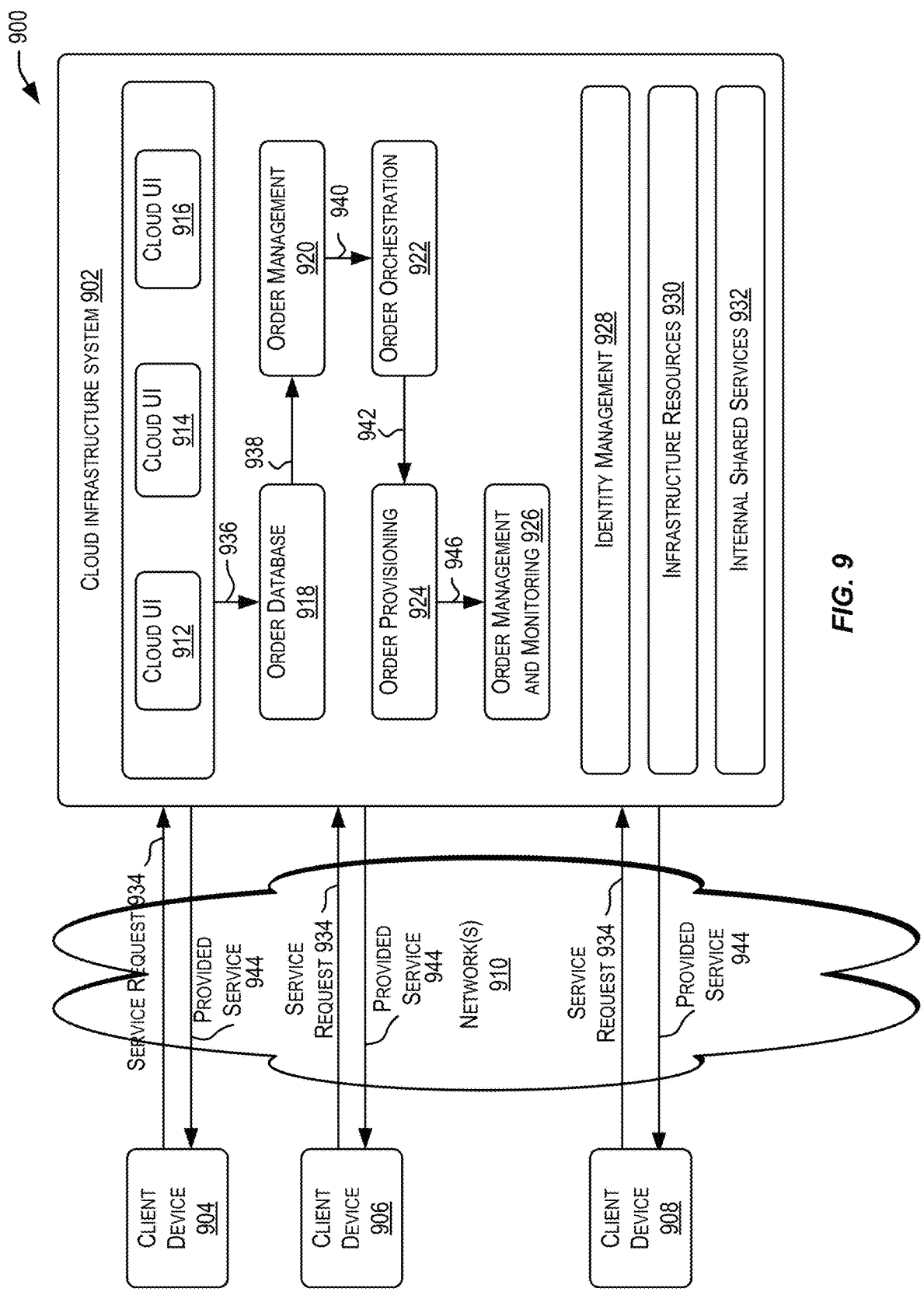
FIG. 9 illustrates a simplified block diagram of one or more components of a system environment in which services may be offered as cloud services, in accordance with an embodiment.

In some embodiments, the message delivery services described above may be offered as services via a cloud environment. FIG. 9 is a simplified block diagram of one or more components of a system environment 900 in which services may be offered as cloud services, in accordance with an embodiment. In the illustrated embodiment in FIG. 9, system environment 900 includes one or more client computing devices 904, 906, and 908 that may be used by users to interact with a cloud infrastructure system 902 that provides cloud services, including services for dynamically modifying documents (e.g., webpages) responsive to usage patterns. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate some of the example embodiments. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

In certain embodiments, services provided by cloud infrastructure system 902 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs.

The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 924 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
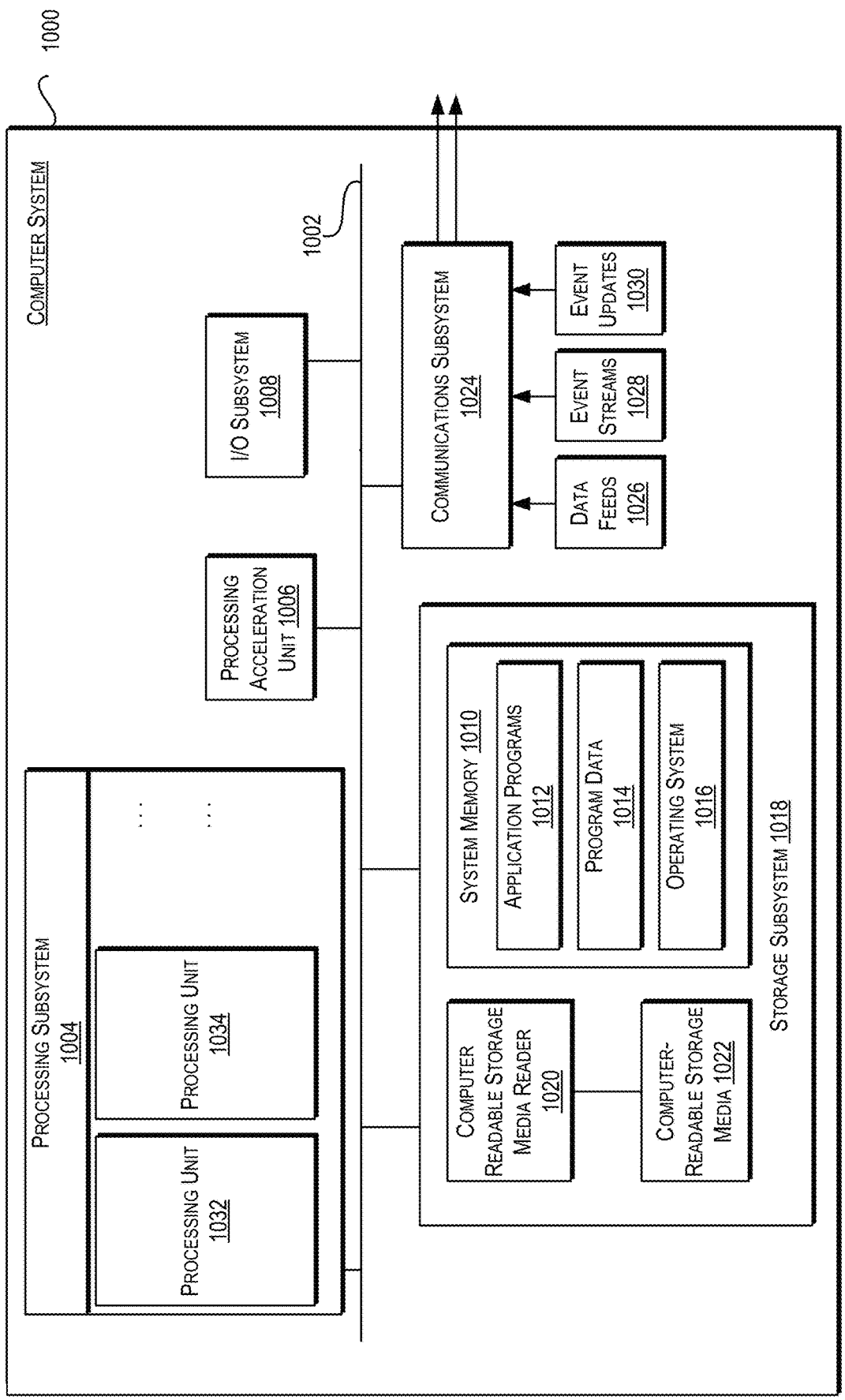
FIG. 10 illustrates an exemplary computer system that may be used to implement certain elements, according to some exemplary embodiments.

FIG. 10 illustrates an exemplary computer system that may be used to implement certain elements, according to some exemplary embodiments. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the example embodiments.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific example embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments is not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although example embodiments have been described, these are not intended to be limiting. Various modifications and equivalents are within the scope of the following claims.

What is claimed is:

1. A method comprising:
    identifying, by a computer including a processor and a memory, an entity of an access management component of an identity management system, wherein the entity is a data structure of the access management component of a plurality of different types of access management components that provide an access management service, wherein the identity management system manages at least one of user identities, user authentication, user authorization, user roles, and user privileges;
    identifying a first attribute metadata for the entity, wherein the first attribute metadata is a parameter associated with the entity;
    creating a data type for the first attribute metadata of the entity, wherein the data type is a single-value data type or multi-value data type that defines the data type of the first attribute metadata;
    modeling the entity in accordance with the created data type by automatically adapting, by the computer, the first attribute metadata to the created entity data type of a unified data model;
    storing the modeled entity in a unified storage in accordance with the created data type for the first attribute metadata of the entity; and
    unifying persistent data from the plurality of different types of access management components for accessing components associated with identity management in the unified storage by vertically tying together the persistent data from the plurality of different types of access management components according to attribute metadata modeled for the created data types of entities of the access management components,
    wherein the unified storage is a single persistent store for the plurality of different types of access management components,
    wherein the unified storage comprises the unified data model which is configured to centrally store a plurality of entities for the plurality of different types of access management components in a uniform manner in accordance with a created data type for attribute metadata of each of the plurality of entities.

2. The method according to claim 1, wherein the unified storage comprises an entity-attribute-value (EAV) data model that is a vertical database model.

3. The method according to claim 1, wherein the entity comprises a hierarchical multi-part name.

4. The method according to claim 3, wherein the hierarchical multi-part name comprises an address for accessing the first attribute metadata in the unified storage.

5. The method according to claim 3, further comprising accessing the entity in the unified storage in accordance with the hierarchical multi-part name of the entity.

6. The method according to claim 1, further comprising querying the unified storage for one or more entities of the access management component.

7. The method according to claim 1, further comprising marking a transaction boundary that is a rollback position of the first attribute metadata for the entity.

8. The method according to claim 1, further comprising partitioning the unified storage for each of a plurality of tenants.

9. The method according to claim 8, wherein the unified storage is partitioned for each of the plurality of tenants according to a hierarchical multi-part name corresponding to each of the plurality of tenants.

10. The method according to claim 1, wherein the defined entity comprises a name value pair.

11. The method according to claim 1, wherein the data type for the first attribute metadata comprises one of a string value, a string array value, and a default value.

12. The method according to claim 1, wherein the access management component comprises one of a web access management component, an enterprise single-sign on (ESSO) component, an open authorization component (OAuth), an identity propagation and federation component, a mobile and social sign-on component, and an adaptive access.

13. The method according to claim 1, further comprising adding a new component, and in response to addition of the new component, dynamically modeling metadata of the access management component in the unified storage in accordance with a generic data model.

14. The method according to claim 1, wherein the access management component supports a multi-tenant environment comprising a plurality of tenants, and wherein the unified data model supports multi-tenant data isolation for the plurality of tenants.

15. A non-transitory computer-readable storage medium storing a plurality of instructions executable by one or more processors to cause the one or more processors to perform operations comprising:
   identifying an entity of an access management component of an identity management system, wherein the entity is a data structure of the access management component of a plurality of different types of access management components that provide an access management service, wherein the identity management system manages at least one of user identities, user authentication, user authorization, user roles, and user privileges;
   identifying a first attribute metadata for the entity, wherein the first attribute metadata is a parameter associated with the entity;
   creating a data type for the first attribute metadata of the entity that defines the data type of the first attribute metadata;
   modeling the entity in accordance with the created data type by automatically adapting the first attribute metadata to the created entity data type of a unified data model;
   storing the modeled entity in a unified storage in accordance with the created data type for the first attribute metadata of the entity; and
   unifying persistent data from the plurality of different types of access management components for accessing components associated with identity management in the unified storage by vertically tying together the persistent data from the plurality of different types of access management components according to attribute metadata modeled for the created data types of entities of the access management components,
   wherein the unified storage is a single persistent store for the plurality of different types of access management components,
   wherein the unified storage comprises the unified data model which is configured to centrally store a plurality of entities for the plurality of different types of access management components in a uniform manner in accordance with a created data type for attribute metadata of each of the plurality of entities.

16. The computer-readable storage medium according to claim 15, wherein the unified storage comprises an entity-attribute-value (EAV) data model that is a vertical database model.

17. The computer-readable storage medium according to claim 15, wherein the entity comprises a hierarchical multi-part name.

18. The computer-readable storage medium according to claim 17, wherein the hierarchical multi-part name comprises an address for accessing the first attribute metadata in the unified storage.

19. The computer-readable storage medium according to claim 17, further comprising accessing the entity in the unified storage in accordance with the hierarchical multi-part name of the entity.

20. The computer-readable storage medium according to claim 15, further comprising querying the unified storage for one or more entities of the access management component.

21. The computer-readable storage medium according to claim 15, further comprising marking a transaction boundary that is a rollback position of the first attribute metadata for the entity.

22. A system comprising:
   a memory; and
   one or more processors coupled to the memory and configured to:
      identify an entity of an access management component of an identity management system, wherein the entity is a data structure of the access management component of a plurality of different types of access management components that provide an access management service, wherein the identity management system manages at least one of user identities, user authentication, user authorization, user roles, and user privileges;
      identify a first attribute metadata for the entity, wherein the first attribute metadata is a parameter associated with the entity;
      create a data type for the first attribute metadata of the entity, wherein the data type is a single-value data type or multi-value data type that defines the data type of the first attribute metadata;
      model the entity in accordance with the created data type by automatically adapting the first attribute metadata to the created entity data type of a unified data model;
      store the modeled entity in a unified storage in accordance with the created data type for the first attribute metadata of the entity; and
      unify persistent data from the plurality of different types of access management components for accessing components associated with identity management in the unified storage by vertically tying together the persistent data from the plurality of different types of access management components according to attribute metadata modeled for the created data types of entities of the access management components,
      wherein the unified storage is a single persistent store for the plurality of different types of access management components,
      wherein the unified storage comprises the unified data model which is configured to centrally store a plurality of entities for the plurality of different types of access management components in a uniform manner in accordance with a created data type for attribute metadata of each of the plurality of entities.

* * * * *